July 29, 1969 R. J. LYNCH 3,458,689

SOLID STATE SENSING AND ENCODING DEVICE

Filed Oct. 20, 1965

INVENTOR.
ROBERT J. LYNCH

BY Robert E. Sandt

AGENT

United States Patent Office 3,458,689

Patented July 29, 1969

3,458,689

SOLID STATE SENSING AND ENCODING DEVICE

Robert J. Lynch, Lake Peekskill, N.Y., assignor to International Business Machines Corporation, Armonk, N.Y., a corporation of New York Filed Oct. 20, 1965, Ser. No. 498,695
Int. Cl. G06k 7/14
U.S. Cl. 235—61.11 4 Claims

ABSTRACT OF THE DISCLOSURE

The disclosure describes a radiation sensing device including a plurality of pairs of photodiodes and diodes connected back to back. The other side of each of the photodiodes is connected to a separate point along a voltage divider. The other side of each of a first group of the diodes is connected to an output bus and the other side of each of the rest of the diodes are interconnected to the diodes of the first group in a particular combination. The photodiodes are selectively responsive to light passing tnrough holes in a punched card in a first code and the diodes are scanned by a ramp voltage applied to the output bus to produce serial output pulses on the output bus in a second code. The ramp voltage serves to change the bias conditions of the diode pairs in time sequence.

In electronic data processing systems, it is conventional practice to introduce data and machine instructions into the system by means of punched cards. This information, after the initial entry thereof, is stored in the data processor in various hierarchal storage media in accordance with the required speed of access thereto. In such application, it is necessary not only to sense the perforate pattern of the cards, but also to convert the data content thereof to a codal representation compatible with the electronic data processing machine.

The present invention, in addition to sensing the holes in a card, converts the codal representation to one compatible with the machine which will process the data.

The invention employs a plurality of photodiodes, one for each potential columnar hole position, for receiving light through the holes in the card. These photodiodes are connected to different discrete potential source levels so that the conductivity status of each of the photodiodes may be interrogated at successive time periods corresponding to the codal bit times of the target code to which the hole code is to be converted. The interrogation is effected by applying a time variant voltage in parallel to a plurality of diodes which are combinatorially connected to the photodiodes. This ramp voltage successively biases the blocking diodes into their reverse conduction region to disconnect predetermined ones of the photodiodes from the common load circuit to produce a succession of output pulses manifestive of the codal bit of the target code corresponding to the sensed perforate pattern.

It is, therefore, an object of this invention to provide a device for sensing a record member having data recorded therein in a first codal pattern adapted to produce a variably illuminated pattern manifestive of the data, and to convert the data thus sensed into a second code manifested by a sequence of data bits manifestive of the data, in response to an interrogation signal having a voltage characteristic which is a predetermined function of time.

A further object of the invention is to provide a perforated record member sensing device for sensing the data recorded in the record member in a first code and converting the data thus sensed into a second code manifested by a sequence of pulses indicative of the data, in response to an interrogation signal having a linearly ascending potential level with respect to time.

Yet another object of the invention is to provide a solid state perforated record member sensing and code converting device employing a plurality of photoresponsive asymmetrically conductive devices in circuit with predetermined combinations of other asymmetrically conductive devices wherein the photoresponsive devices are sequentially tested for their conductivity status by application of a time variant voltage to the other asymmetrically conductive devices to bias these devices into a state on nonconductivity whereby the photo-responsive devices will be disconnected from a common load circuit in a predetermined order to manifest their conductivity status by a sequence of pulses in the destined code.

The foregoing and other objects, features and advantages of the invention will be apparent from the following more particular description of a preferred embodiment of the invention, as illustrated in the accompanying drawing.

Figure 1:
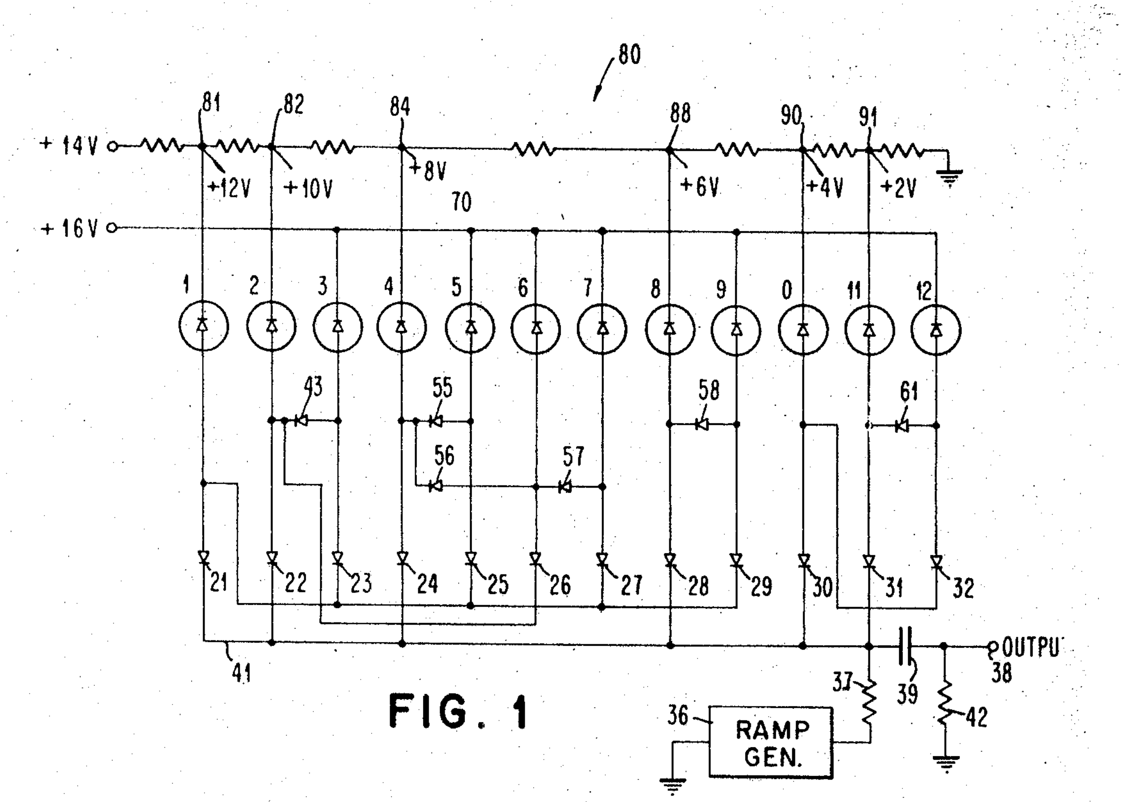
FIG. 1 is a circuit diagram of the invention.

Before turning to the operation of the apparatus of FIG. 1, it is expedient to understanding the environment in which the invention operates, as well as the function which it performs. As previously stated, information is conventionally entered into an electronic data processor by punching a deck of cards. This deck of cards is then read and converted to a code compatible with that in which the data processor operates, usually a modified form of binary-coded-decimal (BCD). While the data processor is eminently qualified to code convert, it is uneconomic to employ such a complex piece of equipment to perform this simple function. If, as in the present invention, the card sensing and code conversion can be combined in an efficient inexpensive device, the inefficient use of a computer for such a menial task may be obviated.

In the table to follow the symbol is printed in the first column, the card code (IBM Hollerith Code) is printed in the second column, and the ultimate code (BCD) is shown in the third column. It will be noted that the numerical digits in the card code are represented by a single hole 0 through 9. These numerical values have a direct conversion to BCD as the sums of the appropriate powers of two. The alphabetic characters in card code are combinations of one numerical punch and one zone hole (0, 11, 12). In BCD code, the alphabetic characters convert to the BCD code equivalent to the numerical value of the card code and combinations of two zone "bits" (A and B) to achieve the requisite three zone combinations. This conversion permits the conversion from card code to the modified binary coded decimal code for the following symbols:

| Symbol | Card Code | BCD | Symbol | Card Code | BCD |
|---|---|---|---|---|---|
| 1 | 1 | 00 0001 | A | 12-1 | 11 0001 |
| 2 | 2 | 00 0010 | B | 12-2 | 11 0010 |
| 3 | 3 | 00 0110 | C | 12-3 | 11 0011 |
| 4 | 4 | 00 0100 | D | 12-4 | 11 0100 |
| 5 | 5 | 00 0101 | E | 12-5 | 11 0101 |
| 6 | 6 | 00 0110 | F | 12-6 | 11 0110 |
| 7 | 7 | 00 0111 | G | 12-7 | 11 0111 |
| 8 | 8 | 00 1000 | H | 12-8 | 11 1000 |
| 9 | 9 | 00 1001 | I | 12-9 | 11 1001 |
| 10 | 10 | 01 0000 | J | 11-1 | 10 0001 |
| # | 3-8 | 00 1011 | K | 11-2 | 10 0010 |
| @ | 4-8 | 00 1011 | L | 11-3 | 10 0011 |
| $ | 11-3-8 | 10 1011 | M | 11-4 | 10 0100 |
| * | 11-4-8 | 10 1100 | N | 11-5 | 10 0101 |
| . | 12-3-8 | 11 1011 | O | 11-6 | 10 0110 |
| □ | 12-4-8 | 11 1100 | P | 11-7 | 10 0111 |
| , | 0-3-8 | 01 1011 | Q | 11-8 | 10 1000 |
| % | 0-4-8 | 01 1100 | R | 11-9 | 10 1001 |
| | | | S | 0-2 | 01 0010 |
| | | | T | 0-3 | 01 0011 |
| | | | U | 0-4 | 01 0100 |
| | | | V | 0-5 | 01 0101 |
| | | | W | 0-6 | 01 0110 |
| | | | X | 0-7 | 01 0111 |
| | | | Y | 0-8 | 01 1000 |
| | | | Z | 0-9 | 01 1001 |

In the apparatus of FIG. 1, light selectively impinges on the photodiodes 1 through 12 in accordance with the pattern of holes in a single column of an IBM card. From the preceding table, it can be perceived that one and only one zone hole will be punched for any one character, and that a numerical punch in combination with a zone punch delineates an alphabetic character. Numerical characters are recorded as a single punch zero through nine. Special characters are punched as combinations of two numerical punches with or without a zone hole. The apparatus illustrated not only detects the pattern of perforations in a card column but also converts the pattern to the BCD code and produces a serial train of pulses.

Each of the photodiodes 1 through 12 has connected in opposing conductivity thereto a respective corresponding blocking diode 21 through 32. The blocking diodes 21, 22, 24, 28, 30 and 31 representing direct one-for-one code conversion from IBM code to BCD code are directly connected to the bus 41. Diodes 23, 25, 26, 27, 29 and 32 are connected via intervening diodes to bus 41 to effect the multiple bit signals required for the conversion of the code for the characters three, five, six, seven, nine, and the zone hole twelve.

Since the numeral three in BCD requires a combination of the $2^0$ bit and the $2^1$ bit, the photodiode 3 is connected via blocking diode 23 to blocking diode 21 ($2^0$ bit diode) and via blocking diode 43 to blocking diode 22 ($2^1$ bit diode). As will be explained, activation of photodiode 3 will yield an output through blocking diodes 21 and 22 at their successive times of activation.

Photodiode 5 requires connection to the $2^0$ and $2^2$ BCD bit circuits. Therefore, blocking diode 25 is connected to blocking diode 21 to effect the $2^0$ conversion. Similarly, photodiode 5 is connected via blocking diode 55 to the $2^2$ bit diode 24.

Similarly, the photodiode 6 is connected to the $2^1$ and $2^2$ bit diodes 22 and 24 through blocking diode 26 (to diode 22) and through diode 56 to diode 24. This effects, the decoding of the IBM numerical six code into the BCD $2^1$ and $2^2$ bit elements.

The IBM seven hole punch requires binary ones in the $2^0$, $2^1$ and $2^2$ bit positions. With activation of photodiode 7, diode 27 passes its response to diode 21 (the $2^0$ diode). The $2^1$ diode 22 is activated through diodes 57 and 26 (in series). The $2^2$ diode 24 is activated from photodiode 7 through the serially connected diodes 57 and 56.

The final numerical hole photodiode 9 requires the activation of the $2^0$ and $2^3$ BCD diode circuits. This is effected through diode 29 which is connected to diode 21 for the conversion to the $2^0$ bit. The $2^3$ bit conversion is achieved through connection of photodiode 9 to blocking diode 58 and the $2^3$ diode 28.

The zone hole conversion, as shown in the above table, requires that a zero punch be directly converted as a $2^4$ BCD binary bit. This conversion is effected through diode 30. Similarly, an IBM eleven zone hole punch requires a $2^5$ BCD binary bit. This circuit is traceable from the photodiode 11, through blocking diode 31, to bus 41. Finally, the IBM twelve zone hole punch dictates activation of the $2^4$ and $2^5$ BCD binary bit circuits. The former is achieved through connection of photodiode 12 through blocking diode 32 to the $2^4$ diode 30. The latter ($2^5$) connection is traceable through diode 61 to diode 31.

Figure 2:
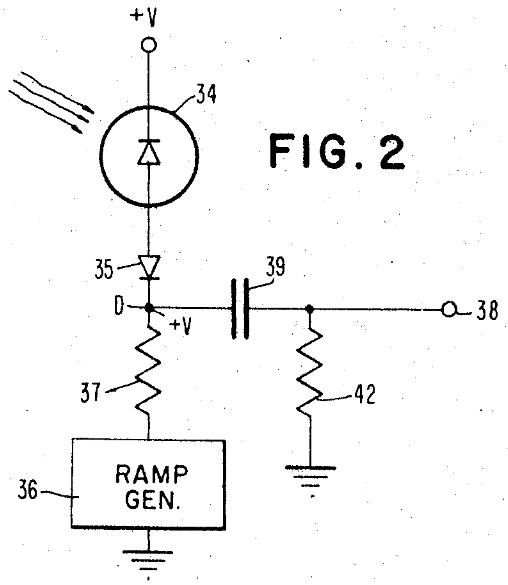
FIG. 2 is a fragmentary circuit diagram which explains the principle of operation of FIG. 1.

Before proceeding with the explanation of the serializing of the BCD outputs, it is well to digress and examine the two phenomena which are exploited in the operation of FIG. 1. The first of these is the increase in the conduction of a photodiode in the reverse direction with the incidence of light on the photodiodes. Thus, if as in FIG. 2 the photodiode 34 is connected back-to-back with a blocking diode 35 between a source of potential +v. and a resistor 37 and ramp voltage generator 36 to ground, there will be substantially no conduction if the photodiode is dark. With no voltage output from ramp voltage generator the photodiode 34 will act as a conventional diode to prevent current flow. As the ramp voltage generator 36 increases, its voltage output to +v. the rules of the two diodes will switch, and diode 35 now becomes reversely biased to prevent current flow, even though photodiode 34 is forwardly biased. Thus, the potential of point D undergoes a steady slow increase in voltage which, if the time constant of the RC circuit 42 and 39 is properly chosen will yield no output response at terminal 38. The slight unbalance in characteristics of the diodes 34 and 35 may yield a small blip at terminal 38. This is useful as a clocking pulse and can readily be distinguished from the substantially larger photo response.

If the photodiode 34 is illuminated, it will conduct with substantial back current. Thus, with ramp voltage generator 36 at zero output, current will flow from +v. through diode 34 (back-biased and lighted), diode 35 (forwardly biased), resistor 37, ramp generator 36 to ground. Point D will, therefore, assume a positive potential equal to the voltage drop across resistor 37 (assuming resistor 37 has a high impedance relative to ramp generator 36). As the ramp generator 36 increases in voltage, and the potential difference across the back-to-back diodes approaches zero, the current flow will decrease along the response curve of a reversely biased lighted photodiode, until the blocking diode response curve takes over to limit the current flow. Point D follows the potential of the ramp voltage generator 36 until the voltage of point D is substantially equal to the potential +v. This is true because the reverse current through an illuminated photodiode is substantially independent of the potential difference across it at higher potential differences. The voltage at point D, therefore, is equal to the ramp voltage plus the voltage drop across resistor 37, which voltage drop is constant until the transition occurs in the region of zero potential difference between point D and +v. At this transition point the photocurrent is highly voltage sensitive and reduces rapidly to zero and reverses as the potential of point D exceeds +v. In this latter condition the reverse flow is limited to the minimal flow through the now reversely biased blocking diode 35. It is only in the non-linear transition region near zero voltage difference where the blocking diode ceases conduction will a sharp decrease in the current of point D be detected.

This pulse output at terminal 38, therefore, determines whether the photodiode is illuminated, indicating the presence of a hole in the card. Reference to FIG. 1 reveals that the photodiodes 1 through 12 are connected either to the bus 70 or to the various taps of the voltage divider 80. Each respective pair of photodiodes and blocking diodes will experience the zero voltage difference transition at a different potential level. Since the ramp voltage generator 36 raises the potential of bus 41 in a sawtooth waveform the respective transitions will occur serially. If one assigns representative voltages to the various circuit points the serializing effect becomes readily apparent. These assumed voltages are shown in the diagram of FIG. 1.

With the voltages shown in FIG. 1, and with no output from the ramp generator 36, all of the blocking diodes will be forwardly biased and all of the photodiodes will be reversely biased. The current flow through resistor 37 and the ramp generator 36 to ground will be equal to the sum of the individual photocurrents through the photodiodes 1 through 12. If none of these is illuminated, the current flow will equal the sum of the dark currents. Any one or more illuminated photodiodes will contribute its share of the total current. It will be noted that bus 70 is connected to a positive 16 volt supply, and that the voltage divider taps 81, 82, 84, 88, 90 and 91 assume the respective potentials of +12 v., +10 v., +8 v., ∓6 v., +4 v. and +2 v. With this voltage disposition, all positive with respect to ground the photodiodes will all be reverse biased and the blocking diodes forward biased, as stated above.

As the ramp voltage generator produces its increasing voltage waveform, the first transition will occur at +2 volts when the current flow from tap 91 through photodiode 11 and blocking diode 31 to bus 41 will cease, because the blocking diode is now entering its reverse bias condition. If the photodiode 11 is illuminated, this cessation of conduction will yield an output pulse at terminal 38, through the differentiating action of capacitor 39 and resistor 42. The magnitude of this output pulse will be large if photodiode 11 is illuminated, and very small if it is dark. The output pulse on terminal 38 corresponds to the first BCD bit or "B" pulse.

A further source for the first BCD "B" pulse is the photodiode 12. If it is illuminated, it will conduct in the reverse direction from bus 70 (+16 volts) through diode 61 and 31 to bus 41. It will also conduct through diode 61 and photodiode to the +2 volt tap 91 on voltage divider 80. Further conduction through photodiode 12 (lighted) will proceed through diodes 32 and 30 to bus 41, and through diode 32 and photodiode 0 to the +4 volt tap 90 on voltage divider 80. The photocurrent from photodiode 12 will, therefore, be divided between four paths to ground. As the ramp voltage increases to approximately +2 volts, one of these four circuit paths namely that through diode 31 will be biased out of circuit as the diode 31 enters reverse bias. The photodiode current now flows, through diodes 61 and photodiodes 11, through diodes 32 and 30 to bus 41, and through diode 32 and photodiode 0 to the tap 90 on the voltage divider. The cessation of current flow through diode 31 manifests itself as a sharp diminution in total current flow through resistor 37 and a consequent sharp decrease in the current to bus 41. This, when differentiated, yields the negative "B" pulse.

When the ramp voltage generator 36 achieves +4 volts, the second circuit leg, including the photodiode 12 (illuminated), diode 32, and diode 30 is switched out of the bus 41 circuit to yield a second change in current flow through the load resistor 37 and a second or "A" BCD codal output pulse on terminal 38. This then completes the requisite conversion from a Hollerith 12 hole punch to B and A BCD bits.

If, instead of a 12 hole punch, the card were punched with O hole, then the ramp generator would back-bias diode 30 to eliminate the photo-induced back current flow through photodiode O from the bus 41. This would again produce the requisite output pulse. Since no two zone holes are simultaneously punched, the dark current flow through photodiodes 11 and 12 will not affect the detection of a O hole.

As the ramp voltage increases beyond +4 volts any photo-induced current flow through photodiode 12 will continue to flow through both photodiodes 11 and 0 (acting as normal forward conducting diodes) to their respective taps 91 and 90 on the voltage divider 80. However, no further change in the flow of current through bus 41 due to the illumination of photodiode 12 will be experienced. The interrogation of the status of photodiodes 12, 11 and 0 is complete at the +4 volt level of the ramp generator. Depending on the hole punched, there will be no A or B pulses (no zone hole), a B pulse only (11 punch), an A pulse only (O punch), or an A and B pulse (12 punch).

When the ramp voltage achieves +6 volts, the blocking diode 28 becomes reverse biased to yield an output pulse on terminal 38 if either of the photodiodes 8 or 9 is illuminated. Again, as in the previous example, the current from photodiode 9 divides to flow to tap 88 and to bus 41. The cessation of forward conduction of diode 28 switches all of the current flow of photodiode 9 to and through photodiode 8 (acting as a conventional diode) to tap 88. Since photodiodes 8 and 9 will never both be illuminated, this latter current flow does not interfere with the detection of an 8 hole, which produces a direct flow through diode 28 with no residual flow when diode 28 cuts off.

When the ramp voltage level achieves +8 volts the blocking diode 24 goes into reverse bias to interrogate the conductivity status (illumination) of the photodiodes 4, 5, 6 and 7, since these Hollerith values all convert to a four-bit in the BCD code. If photodiode 4 is illuminated, the reverse biasing of blocking diode 24 cuts off the photocurrent therethrough to produce the requisite change in current flow through load resistor 37 for a negative pulse output on terminal 38.

If at the +8 volt ramp level photodiode 5 is conducting, the diode 24 will cut off the current flow from the +16 volt bus 70 through the photodiode 5, diode 55, and the diode 24, to bus 41 to yield the requisite output pulse on terminal 38. Part of the remaining photocurrent flows from bus 70, through photodiode 5, diode 55, and photodiode 4 (forward conduction) to terminal 84 (+8 volts). The rest of the photocurrent through photodiode 5 flows through diode 25, and diode 21 to bus 41, so as to supply current for the requisite future interrogation of photodiode 5 for the presence of BCD one bit.

Similarly, a part of the current flow through photodiode 6, diode 56, and diode 24 will be cut off when the ramp voltage achieves the +8 volt level. This signals the four bit BCD code element if the photodiode 6 is illuminated. The continuing flow from bus 70 through photodiode 6, diode 56, and photodiode 4 (forwardly conducting) to terminal 84 persists. The flow from bus 70, photodiode 6, diode 26, and diode 22, to bus 41, also persists until the interrogation for the presence of the BCD two bit is required.

The final photodiode requiring interrogation is that for the Hollerith seven. Current flow through photodiode 7 (when illuminated) initially divides into a plurality of series parallel circuits to ground. The first of these to be cut off is that from bus 70 (+16 volts), photodiode 7, diode 57, diode 56, and diode 24, to bus 41. This cuts off at the +8 volt ramp level, when diode 24 goes into back bias, allowing the current flow to persist in part of the serial path through photodiode 4 to tap 84. A second initial current path, which persists to at least the next interrogation, is that from bus 70 (+16 volts), photodiode 7, diode 57, diode 26, and diode 22, to bus 41. This latter path is further divided following diode 26, through photodiode 2 to the voltage divider tap 82. A further path for the photocurrent of photodiode 7 is through diode 27, and diode 21 to bus 41. This path further divides after diode 27 to flow also through photodiode 1 to tap 81 (+12 volts) on the voltage divider 80. Thus, at the +8 voltage level photocurrent from one of the illuminated (if, in fact, it is illuminated) photodiodes 4, 5, 6 or 7 will be abruptly removed from the common load resistor 37 to produce the differentiated output pulse on terminal 38.

The next interrogation step occurs at the +10 volt ramp level, when a signal for the BCD two bit codal element will be generated if either a Hollerith two, three, or six is present. If photodiode 2 is illuminated, the ramp voltage will, by back-biasing diode 22, cut off the current flow from tap 82, through photodiode 2, and diode 22 to bus 41. This provides the output response of a BCD two for a Hollerith two.

If photodiode 3 is illuminated, the flow from bus 70 through that diode proceeds diode 43, and diode 22, to bus 41 to provide the output pulse associated therewith. Flow, however, continues through photodiode 2 to tap 82. To provide the further required circuit path, diode 23 provides the connection for photodiode 3 to and through diode 21 to bus 41. This path persists until the final interrogation level. The final path for a portion of the photocurrent through photodiode 3 is from bus 70, photodiode 3, diode 23, and photodiode 1 to tap 81.

The final function of the +10 volt ramp level is to interrogate for the presence of a Hollerith six. This is achieved again through the transition of the diode 22 from forward to reverse conduction as the ramp level achieves the requisite potential. The cessation of conduction of diode 22, destroys the current path from bus 70, through photodiode 6, diode 26, to and through diode 22 to bus 41. The path through diode 26 and photodiode 2 remains after the cutoff of diode 22.

The final ramp voltage drive interrogates for the presence of a BCD one, which is an element in all of the odd Hollerith numerals. This interrogation occurs when the ramp voltage achieves a level of +12 volts to back-bias the diode 21 to cut it off. If photodiode 1 is illuminated and conducting from tap 81 (+12 volts) to and through diode 21, the elevation of the ramp voltage to back-bias diode 21 interrupts this flow to provide the requisite output pulse. If photodiodes 3, 5, 7 or 9 (all odd) are illuminated, then the forward conduction of photodiode 1 acts as a sort of clamp to bias the diode 21 at approximately 12 volts. The ramp voltage acts against this clamp to provide the reverse bias of diode 21 to sense the conductivity status of the odd numbered photodiodes 3, 5, 7 and 9.

From the foregoing detailed explanation of the operation of the circuit of FIG. 1, it is apparent that the photodiodes which sense Hollerith values that convert directly to BCD (viz., 11, 0, 8, 4, 2, 1) are each connected to a different potential tap on the voltage divider 80. Those Hollerith codes requiring combinations of BCD bits have their corresponding photodiodes (12, 9, 7, 6, 5, 3) connected to the common positive bus 70. The photodiodes 1, 2, 4, 8, 0 and 11, if they are illuminated, conduct in the reverse direction for direct conversion and the production of output signals, and if they are dark they conduct in the forward direction to act as voltage clamps to provide the requisite sensing of the conductivity status of the remaining photodiodes. The photodiodes 1, 2, 9, 7, 6, 5, and 3, since they are connected to +16 volt bus 70 either conduct in the reverse direction (if illuminated), or not at all. Since +16 volts is the highest potential level of the apparatus, these latter diodes can never conduct in the forward direction.

It is to be realized that the voltages which were chosen for purposes of explanation were exemplary only and very approximate. No account was taken of relative voltage drops across the various resistors in the circuit or the fact that in some instances the circuit paths may include only two diodes in series, while in others the circuit may include as many as twelve (the seven circuit) in series parallel connection. The variations of the number of diodes in the specific circuits that are active will produce variations in the magnitude of the output pulses on terminal 38. This is easily remedied by applying a clipper to the output which has a clipping level set to the minimum pulse amplitude, or to employ a variable gain amplifier with a fixed output level.

A further feature of the circuit is the ability to detect double numerical punches which represent certain lexical symbols when used together or when used in combination with zone holes denote other special symbols. These symbols together with their Hollerith code and the corresponding BCD code have been shown in the table preceding the explanation of FIG. 1. By appropriate tracing of the circuits in FIG. 1, it should be apparent that the circuits shown therein will implement the relationships set forth in the table.

From the analysis of the circuit diagram, it is apparent that the converse mode of operation may equally well be employed. Just as the respective diodes may be biased out of circuit by an ascending ramp, they may equally well be biased sequentially into circuit by a descending ramp. In this latter instance, the load resistor 37 would reflect a current increase as each diode is biased into the common circuit. The differentiated output then becomes a series of positive pulses.

While the invention has been illustrated for a specific conversion of one code to a second code, it is apparent that the initial and final codes are a matter of choice and that the wiring may be altered to accommodate various codes. It should also be apparent that the photodiodes, the blocking diodes, the voltage divider, and the requisite interconnections may be incorporated into a single integrated structure by suitable semiconductor fabrication techniques. In this instance, the choice of semiconductor materials, the relative disposition thereof, and the fabrication techniques provide the photosensitive junctions, the rectifying junctions, and the resistance necessary to provide the voltage divider function. Since standard hole spacing in a tabulating card is one-quarter inch the fabrication techniques for an integrated structure embodying the principles of this invention are not very exacting.

While the invention has been particularly shown and described with reference to a preferred embodiment thereof, it will be understood by those skilled in the art that the foregoing and other changes in form and details may be made therein, without departing from the spirit and scope of the invention.

What is claimed is:

1. Apparatus for sensing a light pattern representing the respective bits of a datum in a first code by the presence or absence of illumination in predetermined spatial areas, and producing a succession of spaced electrical impulses representing the respective bits of the same datum in a second code, comprising:

(a) a first and a second group of photodiodes adapted to be selectively illuminated by said light pattern manifesting the respective datum bits in said first code, the diodes of said first group representing those datum bits in said first code having a direct corresponding single datum bit in said second code, and the diodes in said second group representing those datum bits in said first code whose equivalence in said second code is represented by more than one datum bit;

(b) means for applying a discretely different potential to a first terminal of each of the photodiodes in said first group;

(c) means for applying a common potential to the first terminals of all the photodiodes in said second group;

(d) a bus;

(e) a blocking diode connected between said bus and a second terminal of each of the photodiodes in said first group in reverse conductivity thereto;

(f) a circuit including at least one diode connecting the second terminal of each of the photodiodes in said second group with the second terminals of each of the photodiodes in said second group representing component bits of the equalivalent multiple conversion into said second code;

(g) means for applying a time variant potential to said bus to change the potential thereof to successively equal each of said discretely different potentials to successively cause said blocking diodes to pass from forward bias to reverse bias.

(h) and means for detecting the change in current flow in said bus as each successive diode changes from forward to reverse bias to produce a succession of pulses manifesting in said second code the illumination status of said photodiodes.

2. Apparatus for sensing the pattern of perforations in a record member representing a symbol in a first code, and producing a succession of electrical impulses representing the symbol in a second code comprising:

(a) a photodiode for each potential hole position in the record member adapted to be selectively illuminated by light passing through the perforations, the photodiodes being divided into two groups, the first of which includes those photodiodes representing those bits in the first code having a direct corresponding single equivalent bit in the second code, and the second of which groups includes those photodiodes representing those bits in the first code whose conversion into the second code employs multiple bits in the second code;

(b) a voltage divider having a plurality of voltage taps thereon each of which provides a different positive potential with respect to ground, the cathode of each of said photodiodes in said first group being connected to a different one of said voltage taps;

(c) a source of positive potential greater than the potential of said taps connected in common to the cathades of all the photodiodes in said second group;

(d) a bus;

(e) a blocking diode connected between said bus and each of said photodiodes in said first group, each blocking diode being connected with its cathode to the bus and its anode to the anode of the corresponding photodiode;

(f) a serial circuit, including at least one diode, connecting each of the anodes of the photodiodes in said second group with the anode of a photodiode in said second group which represents the requisite corresponding component bit in said second code;

(g) a load resistor and variable voltage generator serially connected between said bus and ground, (h) and means for detecting abrupt changes in the potential of said bus, as said variable voltage generator successively potentializes said bus to the potential levels of said taps, and each blocking diode becomes reversely biased to abruptly reduce the current flow therethrough to manifest the illumination status of the photodiodes in the second code.

3. The apparatus of claim 2 wherein the photodiodes in said first group respectively adapted to scan the eleven zone hole, the zero hole, the eight hole, the four hole, the two hole, and the one ole positions in a twelve ole per column tabulating card, which hole positions convert respectively to the first, second, third, fourth, fifth, and sixth serially occurring bits in a six bit second code, and the photodiodes in said second group adapted to scan respectively the twelve hole, the nine hole, the seven hole, the six hole, the five hole, and the tree hole positions in said tabulating card, which hole positions are respectively manifested by the first and second bits, the third and sixth bits, the fourth, fifth, and sixth bits, the fourth and fifth bits, the fourth and sixth bits, and the fifth and sixth bits in the second code, there being a serial diode path from each of the photodiodes in said second group to predetermined photodiodes in said first group in accordance with the foregoing relationship.

4. Apparatus for sensing the perforate pattern in a record card representing data in a first code, and producing serially occurring electrical impulses which manifest the same data in a second code, wherein the codal bits of a first group of bits in said first code each has a single corresponding bit in said second code, and the codal bits of a second group of bits in said second code each has an equivalent combination of bits in said second code, comprising:

(a) photodiode means, one for each potential perforated position in said record and, selectively illuminated by the pattern of perforations to sense data recorded in said first code;

(b) means applying a different potential to each of the photodiodes sensing the codal bits of said first group;

(c) means applying a potential in common to all of the photodiodes sensing the codal bits of said second group;

(d) a bus;

(e) a blocking diode connected between said bus and each of said photodiodes sensing the codal bits of said first group;

(f) a diode connecting each of said photodiodes sensing the codal bits in said second group with those photodiodes in said first group sensing the corresponding codal bits whose combinations represent the conversion of the codal bits of said second group;

(g) means for applying a time variant potential to said bus to successively reverse bias each of said blocking diodes in turn;

(h) and means for detecting the changes in current flow in said bus as each blocking diode becomes reversely biased.

References Cited

UNITED STATES PATENTS

| | | | |
|---|---|---|---|
| 2,678,254 | 5/1954 | Schenck | 340—347.1 |
| 2,687,253 | 8/1954 | McMillan | 235—61.115 |
| 2,791,764 | 5/1957 | Gray et al. | 340—347.1 |
| 2,881,976 | 4/1959 | Greanias | 235—61.115 X |
| 2,966,671 | 12/1960 | Abbott et al. | 340—347.2 |
| 3,061,026 | 10/1962 | Hecox et al. | 340—347.4 |
| 3,389,241 | 6/1968 | Harvey | 235—61.11 |

DARYL W. COOK, Primary Examiner

R. M. KILGORE, Assistant Examiner

U.S. Cl. X.R.

250—219; 340—347

PO-1050
(5/69)

UNITED STATES PATENT OFFICE
CERTIFICATE OF CORRECTION

Patent No. 3,458,689 Dated July 29, 1969

Inventor(s) Robert J. Lynch

It is certified that error appears in the above-identified patent and that said Letters Patent are hereby corrected as shown below:

In the Claims, Claim 1, column 8, line 72, insert--relative--after "conductivity". Claim 2, Column 9, line 36, delete "cathades" and substitute--cathodes--.

SIGNED AND
SEALED
DEC 23 1969

(SEAL)
Attest:

Edward M. Fletcher, Jr.
Attesting Officer

WILLIAM E. SCHUYLER, JR.
Commissioner of Patents